(12) United States Patent
Haverstock et al.

(10) Patent No.: US 7,117,271 B2
(45) Date of Patent: *Oct. 3, 2006

(54) WEB SERVER ENABLING DIRECT SCHEDULING AND CALENDARING CAPABILITY

(75) Inventors: Paul Haverstock, Acton, MA (US); Miguel Estrada, Nashua, NH (US); Julio Estrada, Carlisle, MA (US)

(73) Assignee: Internatioal Business Machines Corporation, Armonk, NY (US)

( * ) Notice: Subject to any disclaimer, the term of this patent is extended or adjusted under 35 U.S.C. 154(b) by 918 days.

This patent is subject to a terminal disclaimer.

(21) Appl. No.: 09/774,117

(22) Filed: Jan. 31, 2001

(65) Prior Publication Data

US 2001/0005848 A1    Jun. 28, 2001

Related U.S. Application Data

(63) Continuation of application No. 09/100,131, filed on Jun. 19, 1998.

(60) Provisional application No. 60/050,155, filed on Jun. 19, 1997, provisional application No. 60/050,154, filed on Jun. 19, 1997, provisional application No. 60/050,153, filed on Jun. 19, 1997.

(51) Int. Cl.
*G06F 15/16* (2006.01)

(52) U.S. Cl. ............................ 709/246; 709/201; 705/9

(58) Field of Classification Search ................ 709/201, 709/203, 205, 206, 207, 217, 246; 705/9, 705/8
See application file for complete search history.

(56) References Cited

U.S. PATENT DOCUMENTS 5,299,304 A    3/1994 Williams et al.

(Continued)

OTHER PUBLICATIONS

Oski, Jonathan A., "Lotus Notes 4.5 Branches into Internet, Intranets," MacWEEK, vol. 11, No. 8, Feb. 24, 1997.

(Continued)

*Primary Examiner*—Paul H. Kang
(74) *Attorney, Agent, or Firm*—Pillsbury Winthrop Shaw Pittman, LLP (57) ABSTRACT

A client/server network enables access to non-HTML objects from a web browser. The system includes a database for storing non-HTML files. A system user requests a non-HTML file from a database using a web browser. The web browser transmits the request to a server via a HTTP server and module. The server locates and retrieves the object requested. The module translates the object to a format supported by the web browser. The HTTP server communicates the translated file to the web browser over a network. The web browser then presents the translated file to the system user.

20 Claims, 3 Drawing Sheets

U.S. PATENT DOCUMENTS

| | | |
|---|---|---|
| 5,513,323 A | 4/1996 | Williams et al. |
| 5,530,852 A | 6/1996 | Meske, Jr. et al. |
| 5,627,764 A | 5/1997 | Schutzman et al. .......... 364/514 |
| 5,675,507 A | 10/1997 | Bobo, II ...................... 364/514 |
| 5,737,601 A | 4/1998 | Jain et al. .................... 395/617 |
| 5,745,360 A | 4/1998 | Leone et al. |
| 5,774,670 A | 6/1998 | Montulli ................. 395/200.57 |
| 5,790,793 A | 8/1998 | Higley |
| 5,799,297 A | 8/1998 | Goodridge et al. ............. 707/1 |
| 5,819,263 A | 10/1998 | Bromley et al. ................ 707/3 |
| 5,819,302 A | 10/1998 | Nielsen |
| 5,842,177 A | 11/1998 | Haynes et al. |
| 5,848,410 A | 12/1998 | Walls et al. |
| 5,862,325 A | 1/1999 | Reed et al. ............. 395/200.31 |
| 5,867,822 A | 2/1999 | Sankar |
| 5,873,085 A | 2/1999 | Enoki et al. ................... 707/10 |
| 5,930,474 A | 7/1999 | Dunworth et al. ...... 395/200.47 |
| 5,944,791 A | 8/1999 | Scherpbier |
| 5,956,483 A | 9/1999 | Grate et al. |
| 5,956,486 A | 9/1999 | Hickman et al. ....... 395/200.36 |
| 5,963,966 A | 10/1999 | Mitchell et al. ............. 707/513 |
| 5,987,422 A | 11/1999 | Buzsaki .......................... 705/9 |
| 5,991,877 A | 11/1999 | Luckenbaugh ............... 713/200 |
| 6,006,228 A | 12/1999 | McCollum et al. ............. 707/9 |
| 6,064,977 A | 5/2000 | Haverstock et al. ............ 705/9 |
| 6,073,109 A | 6/2000 | Flores et al. .................... 705/8 |
| 6,094,684 A | 7/2000 | Pallmann ..................... 709/227 |
| 6,192,415 B1 | 2/2001 | Haverstock et al. ......... 709/245 |
| 6,301,621 B1 | 10/2001 | Haverstock et al. ......... 709/246 |

OTHER PUBLICATIONS

Balderston, Jim, "Fulcrum Boosts Middleware Links to Web," InfoWorld, vol. 18, No. 25, Jun. 17, 1996.

"Fulcrum's Surfboard—Search Technology for Internet," Newsbytes Inc., Mar. 23, 1995.

Kramer, Matt, "Tests Find Notes Client Will Ease Wandering, Database Access," PC Week, vol. 14, No. 21, May 26, 1997.

Gage, Deborah, "Fulcrum Technologies Tries to Stay Ahead of Microsoft," Computer Reseller News, 1996.

Nadile, Lisa, "PC Expo To Get Software Infusion," PC Week, vol. 13, No. 24, Jun. 17, 1996.

Gustavson, Ron, "Compact Disc and portable Webs," E Media Professional, vol. 9, No. 12, Dec. 1996.

WEB SERVER ENABLING DIRECT SCHEDULING AND CALENDARING CAPABILITY

RELATED APPLICATIONS

This is a continuation of application Ser. No. 09/100,131, filed Jun. 19, 1998.

This application claims priority based on U.S. Provisional Patent Application Ser. No. 60/050,153, entitled "Web Server Application", U.S. Provisional Patent Application Ser. No. 60/050,154, entitled "Web Site Creation Development Tool" and U.S. Provisional Patent Application Ser. No. 60/050,155, entitled "Electronic Calendar With Group Scheduling," each filed Jun. 19, 1997. This application is related to co-pending U.S. patent applications entitled, "Web Server With Direct Mail Capability," Ser. No. 09/100,130, filed herewith, "Web Server With Automated Workflow," Ser. No. 09/100,129, filed herewith, "Web Server Providing Role-Based Multi-level Security," Ser. No. 09/100,128, filed herewith, "Web Server With Unique Identification of Linked Objects," Ser. No. 09/100,118, filed herewith, "Web Server With Ability To Process URL With Action Commands," Ser. No. 09/100,117, filed herewith, "Web Server With Integrated Scheduling and Calendaring," Ser. No. 09/100,119, filed herewith, "Web Server Providing HTML Pages Embedded With Non-HTML Views," Ser. No. 09/100,120, filed herewith, and "Web Server Enabling Attachment of HTML and Non-HTML Files To Web Pages," Ser. No. 09/100,121, "Web Server Enabling Browser Access to HTML and Non-HTML Documents," Ser. No. 09/100,131, each filed Jun. 19, 1998, filed herewith.

FIELD OF THE INVENTION

The invention relates to a web server enabling browser access to HTML and non-HTML documents.

BACKGROUND OF THE INVENTION

Web browsers such as Netscape Navigator and Microsoft Internet Explorer are well known. Web browsers are software residing on a client (e.g., a personal computer). Using a browser, the client can communicate with a web server to enable access to and viewing of Hypertext Markup Language (HTML) objects. A web server typically includes a server (e.g., a UNIX-or Windows NT-based computer) connected to a network (e.g., the Internet, an intranet or other network), web server software configured with the host name of the server and the location of HTML objects on the server and the HTML objects stored by that server.

In general operation, to access a web page, a user enters a request for a HTML object by specifying a uniform resource locator (URL) via the browser and hitting "Submit" (or another function key) and the URL is sent to the web server using Hypertext Transfer Protocol (HTTP). The web server responds by locating the HTML object requested and returning it to the browser. The browser receives the HTML object, interprets the HTML codes, translates them into a web page, and displays the web page. In this way, web browsers enable access to the vast number of HTML objects via the World Wide Web, the Internet or intranets. HTML generally is well known. A primary purpose of HTML is to describe how to format the text (and other content) of a web page. HTML uses tags to indicate how text of a web page should be displayed and to specify the URL of objects to which a page is linked. HTML objects are commonly stored on a web server as standard text files with a HTM or HTML extension. Linking is a powerful feature of HTML. One drawback with HTML links is that links are created by coding a page with HTML tags to link it to other objects (e.g., another document or a specific location within a document). Therefore creating web pages and links requires a working knowledge of HTML and the time required to write HTML code a create a page and any desired links. Editing a HTML web page or a link typically requires using HTML to edit the original web page or link. One significant problem with HTML links is that if a web page (or other object linked to it) is moved or deleted, any links to that page or object needs to be manually changed or an error message (e.g., "file not found") may appear when a user clicks on the link.

One limitation of web browsers and web servers is that they were designed primarily to access HTML objects. Browsers typically cannot cause a web server to retrieve and return non-HTML objects. This inhibits a user from accessing non-HTML objects, documents or databases from a web browser. Non-HTML objects, for example, may include databases, non-HTML documents, stored views for documents in a database, identification files stored in a user directory and many other types of objects. Database views provide a convenient way to index a plurality of documents. Identification files may comprise information about a system user (e.g., electronic mail address, role, profile, etc.).

One example of a non-HTML database is Lotus Notes. Lotus Notes is a popular software system, rich with a number of well-known functions. These functions, however, are typically accessed via a client (loaded with Lotus Notes client software) communicating with a server (loaded with Lotus Notes server software). Because Notes is not an HTML-based application, it has not been practical to access objects in a Notes database via a standard web browser.

Prior database systems, for example, Lotus Notes, offer a broad range of well-known features and functions. Lotus Notes databases store a plurality of objects, for example, forms, documents, views, folders, agents, navigators, and other objects.

Forms and documents typically comprise one or more fields. Forms may be used to display and edit documents.

A view is a collection of documents selected and organized based on predetermined user specific processes. Notes determines which documents are to be displayed in a particular view based on the user specified process. Folders are another type of view. Documents within a folder are selected by a user, whereas documents within a view are arranged according to the predetermined user specific processes.

Auto-indexing refers to automatically indexing documents within a database. Auto-indexing may index documents within the database according to fields within the document. Auto-indexing occurs when a document is created. When a document is created, the system lists the document in an index of the database. A database configured to include a Full-text index enables system users to perform full-text searching of the database.

Agents automate a sequence of events. Agents are processes which occur upon the occurrence of an event. For example, Notes agents may be used to automatically organize items within a folder.

Navigators provide a graphical process for finding documents or taking actions without maneuvering through multiple views or find menu commands.

A drawback of prior systems is that powerful non-HTML based database functionality has not been exposed to a web browser. For example, a standard server typically does not have the ability to interpret and respond to a HTML-based browser request.

These and other drawbacks exist.

SUMMARY OF THE INVENTION

An object of the invention is to overcome these and other drawbacks in existing systems.

Another object of the invention is to provide a web server that can respond to requests from a web browser for either HTML or non-HTML objects and return the requested objects to the web browser.

Another object of the invention is to provide a system for interconnecting disparate systems and databases via a Web server platform, for example, to enable the functionality of a non-HTML database (e.g., Lotus Notes) to be exposed to a web browser.

Another object of the invention is to provide a system that enables a web server to provide electronic mail capability directly within a web browser window without having to open another application or window.

Another object of the invention is to provide a system that enables a web server to provide scheduling and calendaring capability directly within a web browser window without having to open another application or window.

Another object of the invention is to provide a system that enables a web server to automatically perform various tasks relating to routing, for example, notifying a user, forwarding a document, etc., based upon the occurrence of a predetermined event (e.g., a web browser request for a particular document, to modify a document, etc.).

Another object of the invention is to provide a system that enables a web server to provide role-based, multi-level security access to HTML and non-HTML objects within a system using a web browser.

Another object of the invention is to provide a system that enables a web server to locate HTML and non-HTML objects using a unique identifier using a web browser.

Another object of the invention is to provide a system that enables a web server to receive and process action commands identified in a URL.

Another object of the invention is to provide a web server that enables HTML and non-HTML objects to be attached to a non-HTML document using a standard web browser.

These and other objects of the invention are accomplished by various embodiments of the invention.

According to one embodiment of the invention, the system comprises a novel web server for a client/server network and a terminal comprising a standard web browser. The server comprises a web server (e.g., a HTTP server), a HTML translator, server software (e.g., Lotus Notes server software) and a database (e.g., a Lotus Notes database).

According to one aspect of the invention, a server processes URL-based requests. The server receives a URL-based request for a non-HTML object (e.g., document or database) from a web browser via a HTTP server. The HTTP server module determines the non-HTML object requested and communicates the information to an interface module. The interface module translates the request into a non-HTML format. The interface module transmits the request to a non-HTML server module. The HTML server module locates the non-HTML object specified by the URL, retrieves the non-HTML object and transmits it to the interface module. The interface module translates the non-HTML object to a HTML object, and passes it to the HTTP server module. The HTTP server module transfers the HTML object to the web browser which presents the HTML object.

Preferably, for URL-based requests for non-HTML objects, the HTML translator maps the URL-based request with a non-HTML database object. Advantageously, however, the web server can also respond to a browser's request for an HTML object using conventional methods.

According to one embodiment, database objects are stored as pages or documents. A page-based database is consistent with the Web's page-based metaphor. Pages within the database can include other objects, such as defined fields and application objects (e.g., JAVA applets, Active X controls, etc.). The use of fields allows pages to be sorted according to certain criteria. By creating Views in a well known manner, these pages can be automatically indexed. In contrast, HTML objects can be indexed by manually creating indexes and links to the pages indexed.

According to another aspect of the invention, web accessible pages and their associated content are stored as a uniform set of objects, which can be easily modified, sorted and displayed via a standard Web browser. The system preferably comprises programmable object stores which may store pages, forms, views, indices, links, folders, navigators or other objects. This enables full text search and automatic indexing using the programmable object store.

Another aspect of the invention is that it provides an interactive collaboration, dynamic publishing, and transactional commerce over the web or other network.

Another aspect of the invention includes the ability to support integrated application development, messaging and workflow monitoring, and enterprise integration.

The system also provides other advantages, for example, role-based, multi-level security, link management, and other features described in greater detail below.

Other objects and advantages of the invention also exist.

DETAILED DESCRIPTION OF THE PREFERRED EMBODIMENTS

Figure 1:
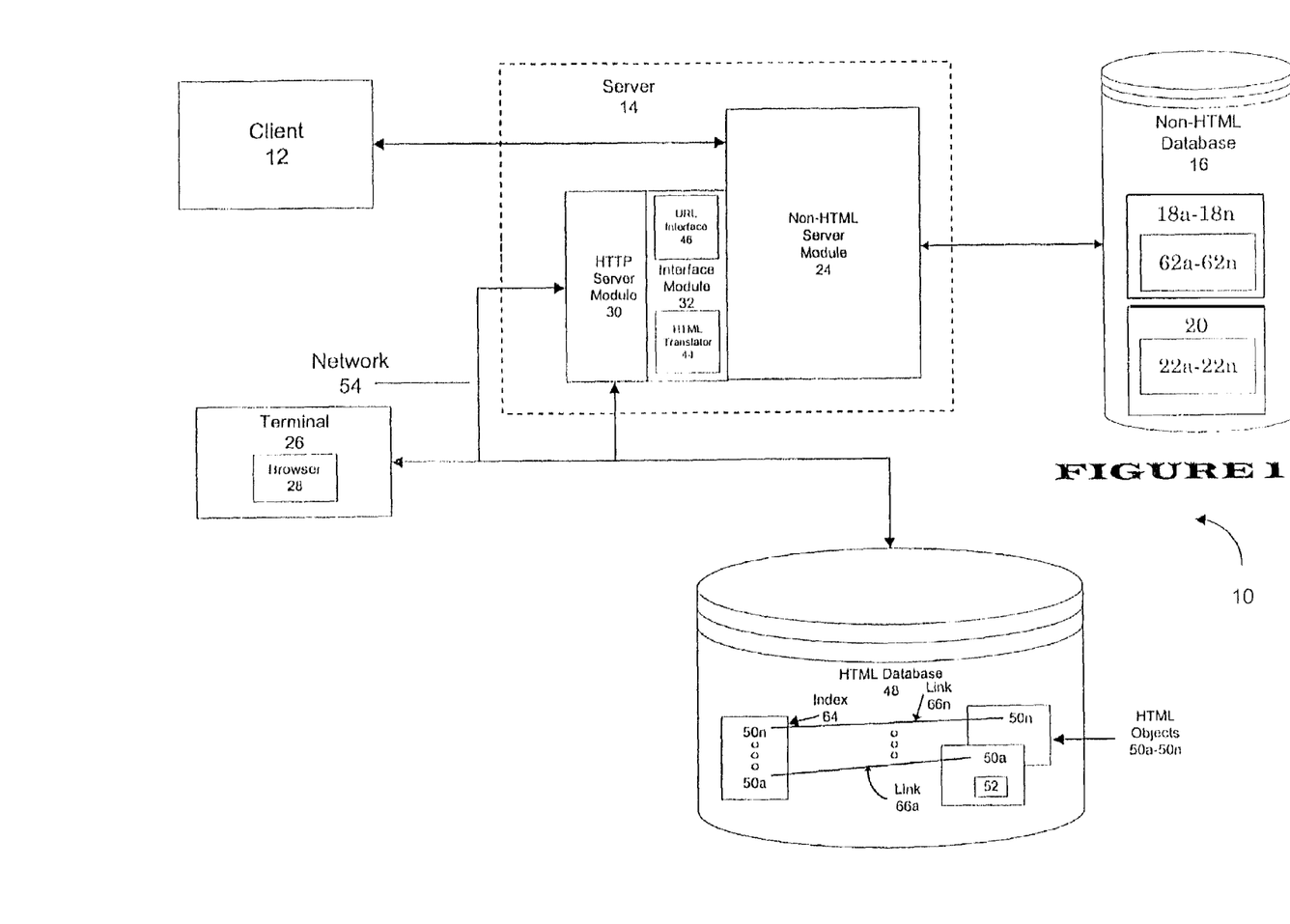
FIG. 1 is a schematic block diagram illustrating an overall system in accordance with one embodiment of the invention.

As schematically illustrated in the block diagram of FIG. 1, one aspect of the invention relates to a client/server network system 10 enabling access to both HTML objects 50*a*–50*n* (e.g., HTML documents) and non-HTML objects 18*a*–18*n* using a web browser 28 residing on a terminal 26. Preferably, web browser 28 supports Internet and Web protocols (e.g., HyperText Transfer Protocol (HTTP) and TCP/IP). The system may further comprise a client 12 to enable a non-browser client access to non-HTML server module 24 to retrieve non-HTML objects 18*a*–18*n* from non-HTML database 16.

A server 14 preferably comprises a HTTP server module 30, interface module 32 and non-HTML server module 24. As further illustrated in FIG. 1, the server side of system 10 may comprise a non-HTML database 16 in communication with server 14. Preferably, non-HTML database 16 stores one or more non-HTML objects 18*a*–18*n*, each at least some of which having one or more non-HTML fields 62*a*–62*n*, and a user directory 20. User directory 20 includes one or more user objects 22a–22n. User objects 22a–22n may include information about a user (e.g., electronic mail address, role, profile, etc.). Terminal 26 and server 14 can be in communication via a network 54 (e.g., Internet, Intranet or other network).

According to one aspect of the invention, a user submits a URL-based request for an object via browser 28. The request is passed to server 14 using HTTP (or other protocol). Server 14 receives the request via HTTP server module 30 and passes object location information to interface module 32 via URL interface 46. URL interface 46 transmits that information to non-HTML server module 24. Non-HTML server module 24 retrieves the requested object and passes it to interface module 32. A HTML translator portion 44 of interface module 32 translates the non-HTML object to a HTML representation of the requested object and the HTML representation is returned to browser 28 via HTTP server module 30.

System 10 also enables browser 28 to access HTML objects 50a–50n using HTTP server 30 or a conventional web server 56 in a known manner. A conventional editor may be used to edit HTML objects within the system. A conventional technique (e.g., a computer gateway interface (CGI)) may be used to store the edited HTML objects in the HTML database.

Thus, one advantage of the invention is that server 14 enables a browser 28 to request both HTML objects 50a–50n and non-HTML objects 18a–18n. Additional advantages derive from this capability. For example, one significant advantage is that the invention exposes powerful resources available in non-HTML databases 16 to a web browser 28 according to one embodiment of the invention.

Preferably, the invention comprises a Lotus Notes server. Advantageously, even with this embodiment a standard browser-based client may be used. As detailed below, Lotus Notes provides the non-HTML server module 24 a rich set of services that has made it a leading messaging and groupware platform. By expressing Notes capabilities to the Web (using a browser) via the present invention, Web developers can take advantage of an architecture that integrates database, security, directory, messaging, workflow, replication, and application development technology in a single platform heretofore lacking in browser based systems using HTML objects.

Lotus Notes, for example, is a robust system offering many features (e.g., forms, views, navigators, agents, folders, etc.). These resources in general are known, however, the ability to expose the features to a web browser is accomplished according to one aspect of the invention. Because Lotus Notes provides these and other features, Notes will be used to illustrate how features of a non-HTML database may be exposed to a web browser using the invention. Although Lotus Notes is used by way of example, the invention may be used with other non-HTML databases.

One advantage of the invention is that it enables browser 28 access to non-HTML objects (e.g., user objects 22a–22n) via a non-HTML server module 24. Through communication with the non-HTML server module 24, browser 28 is provided with additional functionality (i.e., functions supported by non-HTML server module). For example, non-HTML server module may comprise a security module. Because browser 28 retrieves non-HTML objects using non-HTML server module 24, the security module controls access to the non-HTML objects based on predetermined criteria. Therefore, this function is exposed to browsers.

For example, system 10 retrieves non-HTML objects 18a–18n via non-HTML server module 24. By communicating with non-HTML server module 24, system 10 permits web browser 28 to utilize functions of non-HTML server module 24. For example, a system user may access non-HTML objects 18 from non-HTML database 16 (e.g., a Lotus Notes database). When non-HTML object 18a is retrieved using non-HTML server module 24, functions associated with non-HTML object 18a become available to the system user. For example, non-HTML object 18a may comprise an agent which transmits a message or facsimile notifying another system user that non-HTML object 18a has been accessed. The invention exposes this and other functions provided by non-HTML server modules 24 to browsers 28.

The system may use a bi-directional replication process to ensure that all system users are accessing the most recent versions of HTML objects 50a–50n. The replication process used is efficient because it is selective, can be scheduled, and can perform at the field-level. Selective replication enables administrators to replicate only a subset of data within the HTML database (for example, specific databases or HTML objects). Replication may be scheduled to run when networking costs are minimized. With field level replication, only those fields within HTML objects that are new or have been changed on either side of the replication process need to be replicated. With these sophisticated replication capabilities as a part of the infrastructure, developers can focus on creating Web applications which enable business processes within and across lines of business and corporate boundaries. The benefit to the user is easier manageability of databases and data integrity in all sites.

During replication, directory changes are also replicated, because the directory is simply another database in the invention, with the same structure and properties as a Web page library. Therefore, for example, discussion forums can be replicated, because discussions are simply another instance of a database.

As described above, links in HTML and non-HTML systems are well known. A HTML system may comprise a HTML database 48 comprising HTML objects 50a–50n. HTML objects 50a–50n are stored using a user assigned filename. The system retrieves HTML objects 50a–50n based on the filename. An index 64 identifies HTML objects 50a–50n in HTML database 48 and provides links 66a–66n to each HTML object 50a–50n. HTML objects 50a–50n may comprise links 66a–66n to other HTML objects 50a–50n.

A non-HTML database 16 (e.g., a Lotus Notes database), however, assigns a unique identifier to non-HTML objects 18a–18n and indexes and retrieves non-HTML objects based on the unique identifier. When a file is created, for example, in a Notes database, a system user designates a filename. In addition to the filename, the system assigns a unique identifier to non-HTML objects 18a–18n and automatically indexes non-HTML objects 18a–18n in an index 64. This technique improves link management. For example, if a user requests non-HTML object 18a by filename, the system uses the unique identifier to retrieve non-HTML object 18a. This reduces the likelihood of receiving a error message indicating, for example, "File Not Found" produced by prior systems if a filename has changed. Prior systems retrieve files by filename and thus may be unable to locate a non-HTML object 18a because a system user has input a previous filename. By assigning a unique identifier to non-HTML objects 50a–50n, the system reduces the occurrence of such errors. The invention enables browser users access to functionality such as unique identification by permitting browser users access to non-HTML server modules. Once a browser accesses a non-HTML server module, many functions provided by the server module are exposed to the browser because the non-HTML server module communicates with the browser as if the browser is a non-HTML client.

Another advantage with unique identifiers is lines updating. A non-HTML index records which non-HTML objects 18a–18n refer to the other non-HTML objects in non-HTML database 16. For example, a user creates a new document or edits an existing non-HTML object 18a and provides a link to non-HTML object 18n. The system identifies non-HTML object 18n with the unique identifier and automatically updates the index to reflect that non-HTML object 18a refers to non-HTML object 18n using a link. The invention exposes this and other functions provided by non-HTML server modules 24 to browsers 28.

Figure 2:
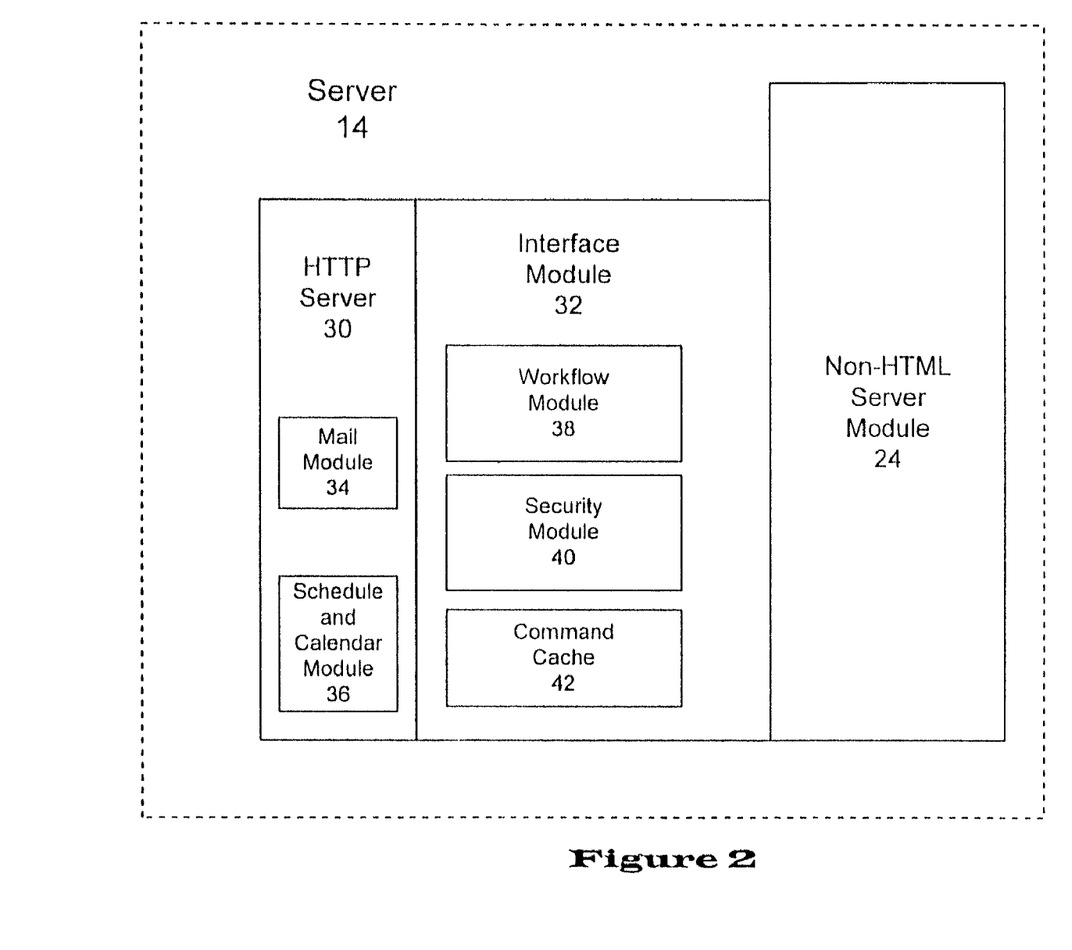
FIG. 2 is a block diagram illustrating an interface module in accordance with one embodiment of the invention.

The system also provides role-based, multi-level security module 40 for controlling access to objects within the system. The system enables an authorized individual to assign users a defined role. Each role may have various privileges based on the priority level of the role. Priority levels may comprise a read only privilege, read and edit privileges, read public information only privileges, etc. For example, a system administrator may have complete privileges to all objects within the system. A law level employee user, however, may have read only privileges for some objects an/or no access to others. These security features may extend to fields within a document. For example, a document containing a person's sales records may include a buyer field. A system user accessing the document may be required to have a certain priority level to view the buyer field. If the system user does not have this priority level, the system user will not be permitted access to that information (e.g., the buyer field may not be displayed). This permits system user's access to be unrestricted controlled on a field-by-field bases whereas prior browser-based systems typically either deny or grant access to a web page or site area.

Additionally, the system provides for high-level security authentication. Before a system user is granted access to an object within the system, the system may authenticate the system user. This may be done by assigning an identification and password to the system user. A system user attempting to enter the system must first enter the user identification and password. If the identification and password do not match the identification and password stored in the system, the system user is not authenticated and access is denied.

Another feature is dynamic generation of content based on a who the system user is. Dynamic generation occurs because each time a user requests a non-HTML object, that object is translated (even if the object has been requested and translated previously). For example, a non-HTML object may contain a date field. Therefore, to update the field, the system translates the non-HTML object each time it is requested.

Dynamic generation may also apply to security. For example, a document may contain certain fields that are access controlled, whereby, depending on who the user is (e.g., based on the user's role) one or another field may be displayed. If a user's role changes (e.g., access privileges revoked), dynamic generation allows the system to update a user s role with the current privileges and restrict access as required.

There are at least three different ways to describe security, each having its own access methods and protocol. One embodiment of the invention provides a solution for each of these different security levels. These are:

Authentication: Confirming who a user is with user names and passwords via a directory;

Authorization: Allowing you to do certain things through Access Control Lists ("ACL"); and Encryption: Protecting what you do through Secure Sockets Layer ("SSL").

Building upon such standard Web security as Secure Sockets Layer, the invention has the ability to granularly control a Web application's delivery of content based on how a user will participate with the application: this is referred to as roles-based access. This feature provides great value to organizations that require secure Web application functionality to enable sensitive business processes. The invention supports SSL which complements ACL. Using its integrated ACL, web server 14 (e.g., a Lotus Domino Server) can control the access and authorization to sensitive HTML objects to only those with the appropriate privileges. For even greater access control granularity, specific fields in a page can be secured and delivered only to specified users.

Access to a page or a field is only part of the security model of the invention. ACL technology also controls the level of functionality each user has. That is, some users are able to modify or update information on an existing Web page directly from a browser. Depending on the page or field that a user is reading, the invention determines the appropriate role:

No Access: A user at this level has no access to the database on the Web site or its associated views and HTML objects. This allows Web developers to easily hide sensitive information as a default function of the Web site. Developers can also hide functionality (for example, buttons, menu items).

Depositor: A depositor can only write to a database. This level is useful for Web-based anonymous ballot boxes or surveys.

Reader: A reader has read-only access to pages on the Web site.

Author: In addition to reading pages, authors can create and post new pages to the Web site. Typically, authors can also edit and delete those Web pages they themselves created.

Editor: Editors can read, write, update and delete pages created by others.

Through tight integration of security and directory services, developers can easily apply access controls by an individual user or group of users. This role-dependent content delivery is transparent to the user.

The value of roles-based access functionality can be illustrated with an application common to most organizations. A Human Resources department wishes to develop a Web application to post job opportunities. Most employees will have reader access to these pages. In addition, hiring managers will have author access so that they can also post new jobs to the database, as well as go back and modify postings that they themselves have authored. Human Resource staff might enjoy editor access, which gives them the ability to make changes to any posting on the site. And perhaps, Finance Department staff might have reader access to all pages, but also have editor access to the salary field, giving them the ability to make changes to just one part of each page. The invention exposes this and other functions provided by non-HTML sever modules 24 to browsers 28.

Workflow is a programmed application that performs one or more tasks according to a pre-defined process (e.g., using agents or macros). Workflow operates to automate, for example, administrator and end-user tasks upon the occurrence of a predetermined event (e.g., a browser request for a particular document, modifying a particular document, etc.). For example, a system user may create an expense report for use by a company. Before the expense report may be used, however, it must be reviewed by a manager. Therefore, a process may be programmed into the server 14 in which all created expense reports are electronically mailed to a manager for review. Workflow may be applied to any document. For example, if a purchase order is created, the order may require from an accounting department. A process may be programmed into the server 14 to automatically mail the purchase order to personnel in the accounting department for approval. Other types of workflow may also be achieved, for example, transmitting an electronic mail message to a system user notifying the user that a document has been accessed, informing a manager that action is required on a particular document (e.g., a request for approval), etc.

As shown in FIG. 2, system 10 may also comprise a workflow module 38. Workflow module 38 distributes, routes and tracks documents according to a predefined process. For example, workflow module 38 may route documents to specific system users in a predetermined order. If a document must be reviewed by specific system users, workflow module 38 routes the document to the system users according to a routing process. It a system user does not act on the document before a predetermined time, workflow engine 38 may notify the system user that action is required, forward the document to another system user, or perform another action identified in the routing process.

Additional features of the invention include quick and easy development and deployment of documents by providing point and click extended HTML design for forms, tables, user interface controls, image maps, links and summary views, for example. The system also provides URL interface access to database servers, such as Lotus Notes®, for example. The system acts on background agents for workflow monitoring and provides templates and design replication for application update and delivery.

The system also allows system users to design features (e.g., databases, forms, views, etc.) in a visual integrated development environment (IDE) using a browser. For example, a system user may create an employment application form. The form comprises various fields requiring system user input. To facilitate the creation of this form, another form having similar fields (e.g., work history form) may be used. For example, the system user may display both forms using Web browser 28. The work history form may have a field which the system user requires in the employment application form. To input the field from the work history form into the employment application form, the system user may simply select and "drag" the field (e.g., by using a conventional computer mouse) into the location in the employment application form and "drop" the field into the employment application form. Other known features of an integrated development environment may also be performed from a web browser due to the present invention.

For example, the Lotus Notes IDE provides developers with a forms-based metaphor that exploits the inventions object store, directory, security, workflow, and replication services. That is, developers using Notes have direct, programmatic access to these robust services, instead of resorting to limited interfaces between a scripting language and a set of services found in separate products and/or servers.

Moreover, the Notes development metaphor lends itself well to the types of business applications deployed on the Internet or on an intranet. For example, if a Notes designer client employs a set of intuitive and flexible application design elements (for example, forms, fields and views) that have great synergy with the pace and link paradigms of the Web. Specifically, developers create forms and populate them with a variety of fields which interact with the user through agents, scripting language, and formulas. The layout and content of the form is automatically translated to HTML and delivered by the invention to the user for viewing in his or her Web browser. Once a form has been populated and saved, it is stored and processed as a page in the database, which can then be linked to other pages using the same hypertext linking mechanism so successfully exploited by the HTTP/HTML protocol set. The use of forms and fields lends itself to rapid application prototyping and development in at least three specific ways.

First, new views can be created on the fly. Because forms consist of fields, developers can sort pages based on the values of those fields on each page. For example, a Human Resources intranet application might include the ability to look up personnel information by first name, last name, department, manager, hire date, job level, etc. A sales management application might include the ability to sort all pages by customer, sales region, sales person, or revenue. If users request to see the information sorted a different way (for example, to sort all pages by social security number), all the developer has to do is create a view based on that field. All the links between all the pages are preserved.

Second, a single change in a form is inherited by all pages that use that form. Because pages in the database are based on a form, any changes to that form are automatically reflected on each page. This makes it easy to make global changes to some or all of the pages in the database. For example, if a company changes the logo it uses for one of its products, the developer simply deletes the old logo from all the forms that use it and replaces it with the new logo. Even if hundreds or thousands of pages use that graphic image, only one change has to be made. This is a vast improvement over Web authoring systems that treat each page independently, so that a single change has to be repeated on every page.

Third, forms are used to create templates, which serve as a rich baseline of functionality for customized applications. The invention includes predefined sets of templates for the most common types of Web applications: discussion forums, document libraries, project management, and review and approval applications. These templates include all of the logic and formatting required for a working application, and can be deployed with no changes. Developers can also add new fields and logic to these templates. These templates also extend basic application development capabilities to power users as well.

Another advantage of the Notes IDE is its ability to reuse application objects from other applications. Forms (or parts of forms) from one application can be reused in new applications. For example, a registration form used to collect leads over the Internet can also be used for an intranet training course application. Whereas the Internet registration form might ask for e-mail address, telephone and fax number, the training class registration form might ask for cost center information. Both forms could use the same template, and the same validation and routing logic. Furthermore, if a change is made to the original template, it is automatically inherited by all the other forms that are based on it. For example, if an employee number changes from four digits to five digits, it might require that the validation logic on the template be changed. Any other forms based on that template will automatically include the new logic as well, saving developers significant time and effort.

Collaboration sites handle the activity that occurs among people and the information that they handle. Topical collaborative activities include discussions and brainstorming, review and approval cycles, human resource employee reviews and candidate interview processes. The creation of most content is a collaborative process: creating a press release, white paper, or even a job posting normally involves more than one person. Providing customer service after a sale has been made is also a collaborative process that involves the customer and at least one other person inside a company. That is, collaboration is an integral activity that surrounds content and commerce. There is very little, if any, Web technology in place to effectively support collaboration.

One embodiment of the invention relates to a Web application server, its basic architecture and the integral services that lend themselves to the rapid development and deployment of collaborative applications that support content and commerce.

To realize these and other capabilities, server 14 may further comprise various modules as depicted in FIG. 2. For example, HTTP server 30 may further comprise a mail application module 34 and a scheduling and calendaring application module 36. Interface module 32 may further comprise a workflow module 38, command cache 42 and a security module 40.

The additional components shown in FIG. 2 enable various capabilities to be provided to enhance the advantages of the system. Each of these components and examples of the added capabilities is described below.

The system user may store HTML pages as objects in HTML database 48. HTML database 48 may comprise a plurality of stored HTML objects. Storing pages as objects results in a object-based HTML database 48 facilitating its use in Internet applications because of the page-based environment of the Internet. Prior systems store files in particular file formats which are not generic to multiple systems. Objects enable various systems to gain access to HTML database 48.

Additionally, HTML database 48 and HTML objects 50a–50n may be programmable. HTML database 48 may be programmed to perform processes for storing, managing and retrieving different data types (e.g., HTML, GIF, JAVA, multimedia, etc.). HTML objects 50a–50n stored within HTML database 48 may also be programmed to perform specific actions. For example, a process to notify a system user that a value of a specific field within HTML object 50n exceeds a predetermined time (e.g., age of document).

Thus, one aspect of the invention features a programmable object store which is suitable to store, manage, and retrieve both complex data types as well as forms and pages. Data types handled by the object store include:

The invention's object store provides a single, consistent approach for data storage which simplifies page management and enhances collaborative Web applications. The invention's object store eliminates the need to structure, track, and otherwise maintain Web site content. Web "pages" and their associated content are stored as a uniform set of objects, easily modified, sorted, and displayed through a Web browser.

All of this information is stored in a single integrated and distributed database. The directory is contained in the same object store as all other applications objects. This means that the directory itself is programmable. It also means that an application is closely associated with the directory. For example, if a Web application has to be replicated to another Web server somewhere else within an organization (say, on an outsourced server at an Internet service provider), all the Web pages, the application logic and the directory are replicated at once as an integrated set.

This is an important distinction from Web application platforms that use one storage mechanism for Web pages and a separate and different storage mechanism for directory information.

By having information beyond just names and addresses, the directory also provides great functionality. For example, if the Company A application required that an account representative receive an alert via pager if a particular customer's inquiry was left unanswered for more than three hours, the developer could simply use the pager number contained in the appropriate field in the directory. The application can include different rules when it sends alerts by e-mail or by pager, and, depending on urgency, whether to use the fastest message route or the lowest cost message route.

Also, the objects within the object store are programmable, so that specific actions can be triggered based upon the value of the information within a specific field or on the status of the page itself (for example, the last time it was opened). For example, in the Company A application, it is possible to have an agent monitor the status of an inquiry. The inquiry itself is a page in the object store, submitted as a form via the Web. The object store can keep track of that page to make sure that someone has actually opened it and read it. If the page remains unopened for too long, the system can automatically take corrective action.

The directory 20 in the present invention includes more than simple names and addresses. It also can include customized fields (e.g., user objects 22a–22n). For example, the Company A directory includes information about specific (roles) that different people fill (for example, service representative, senior service representative, account representative). Depending on the level of urgency of an inquiry, the invention is able to determine from the directory which personnel should be assigned an inquiry.

When a user requests an HTML object from a HTML database using a URL, the URL typically only identifies the object, without identifying any non-HTML commands. In general, HTTP servers use the URL to identify the location of a resource (e.g., an object). They typically do not perform action on or relating to the object itself. By exposing Lotus Notes functionality to a browser-based system, the system of the invention, however, enables non-HTML actions to be identified in the URL and the action to be performed on or relating to the object. For example, a system user wishing to retrieve a sales record for a salesperson ("John") working in the east coast division of "Company A" may enter the following URL into a browser: http://www.companya.com/sales.nsf/east/john?opendoc. This URL permits server 24 (e.g., Notes server) to retrieve the file containing John's sales records and open that document. Other actions may also be used (e.g., run file, create new file, etc.) Additionally, the system user may identify additional non-HTML arguments placed on the file being retrieved. For example, John's sales records file may be opened to display only John's last ten (10) sales, sales that occurred within the past five (5) years, etc.

Identifying non-HTML actions and arguments in the URL allows system users to retrieve objects and identify actions with a single input command without requiring programming code. This is a significant advantage over prior systems that cannot process such action commands included in a URL. For example, in some prior systems, if a system user wishes to have an action carried out when a particular object is retrieved, the action must be preprogrammed into the code or identified outside the URL (e.g., get or post actions). The ability to enable functions without require preprogramming is one feature of the invention.

Preferably, when interface module 32 receives a URL-based request, interface module 32 parses the URL to determine non-HTML object information (e.g., type, identity, location, etc.). If the URL includes an action command to be performed on the non-HTML object, interface module 32 also determines the action to be performed. This information is passed to non-HTML server module 24 which retrieves the requested non-HTML object. Interface module 32 then translates the requested non-HTML object into an HTML object. If an action command is specified in the URL, interface module 32 determines the HTML command corresponding to the non-HTML command supported by non-HTML server module 24 (e.g., open, create, delete, etc.). As part of the process, the HTML command is performed and the HTML object is communicated to web browser 28 via HTTP server module 30.

Translating commands may be performed using a rules-based translation. A rules-based translation mediates between two or more server formats and determines commands corresponding to the other object formats. For example, Lotus Notes includes a table sort command. This permits tables to be sorted according to column headings. If a user wishes to sort a table according to a particular heading, the user may "click" on the heading. Notes then sorts the table according to the heading. If a system user requests a non-HTML object (e.g., a table) from a Notes database and specifies an action command (e.g., sort) in the URL, interface module 32 translates the actions to a corresponding Notes action and performs the action command. Notes creates a view including the sorted table. Interface module 32 then provides a link to the view created.

In addition to identifying non-HTML actions within a URL, system 10 also permits attaching non-HTML objects to HTML objects. For example, a user may attach non-HTML object 18n to HTML object 50a. Attaching files includes storing the attaching object (i.e., HTML object 50a) with the attachment (i.e. non-HTML object 18a). Additionally, a link is provided from HTML object 50a to non-HTML object 18a. The link is provided within HTML object 50n. The link identifies the location of the attachment stored with HTML object 50n. HTML objects may also be attached to non-HTML objects using the above process.

In addition to the above features, system 10 also provides other functions. For example, system 10 provides integrated mail application module 34 and scheduling and calendaring application module 36. System 10 uses web browser 28 to permit reading, creating, editing, etc. of electronic mail messages and calendaring and scheduling of events. The calendaring and scheduling application module 36 permits the system user to invite other invitees to the event (e.g., system users, conference rooms, audio/visual equipment, etc.). For example, using the calendaring and scheduling feature, a system user schedules an event. The system user may then retrieve a form which serves as a template for creating an electronic mail message (e-mail). The e-mail is composed in cooperation with the scheduling application and therefore identifies information concerning the event (e.g., date, time, location, etc.). The system user addresses the e-mail to the invitees using electronic mail addresses stored in a user directory. The user directory may include additional information (e.g., user role, profile, etc.). The e-mail may be provided with a view inquiring whether the invitee accepts, declines, etc. If an invitee accepts, the system will automatically schedule the event in the invitee's calendar. The system user may also input additional information (e.g., textual information, attachments, etc.).

The messaging, calendaring and scheduling function are performed directly through the web browser. A separate window or application does not need to be opened. Prior browser-based systems require separate mail, schedule and calendar applications to be opened in a separate "windows."

One advantage of the server 14 of the present invention as compared with other Web servers is that it exploits the Web to handle the activity that is driven by the information that is posted on the Web site. Two core services of the invention that make this possible are messaging and workflow.

The server supports major industry messaging protocols and Application Programmer's Interfaces (APIs). The invention provides a backbone messaging platform with robust message transfer agents (MTAs) for SMTP, X.400, cc:Mail, and Notes Mail. Messaging services support e-mail clients using industry standards, including Post Office Protocol v3 (POP3) and Internet Mail Access Protocol v4 (IMAP4). The invention also supports other broadly deployed protocols, including Vendor Independent Mail (VIM), and Messaging API (MAPI).

The invention also includes group calendaring and scheduling functionality, and will support standard calendar and schedule protocols as they emerge.

The combination of messaging with calendaring and scheduling functionality provides developers with the tools to create Web applications incorporating workflow. Business processes that have time-sensitive actions and tasks associated with multiple users can be rapidly enabled. For example, a Web application can intelligently route messages and forms to users based on a variety of business relevant conditions (for example, user schedule, time, priority). Also, a Web application can be designed to examine a group of users' calendars, determine the optimal schedule to ensure business processes are completed, and notify each user of impending work.

Company A can take advantage of this messaging and workflow functionality to enable a sophisticated set of processes for managing customer issues. Issue status requests may be routed to the appropriate Company A service representative based on a combination of parameters including the inquirer's company, his or her service level agreement, and the priority of the inquiry. The invention can efficiently handle non-routine occurrences such as re-routing messages destined for absent service representatives by examining their schedules. Also, issue status requests that exceed a specific time threshold can automatically trigger escalation to managers via e-mail or pager.

Figure 3:
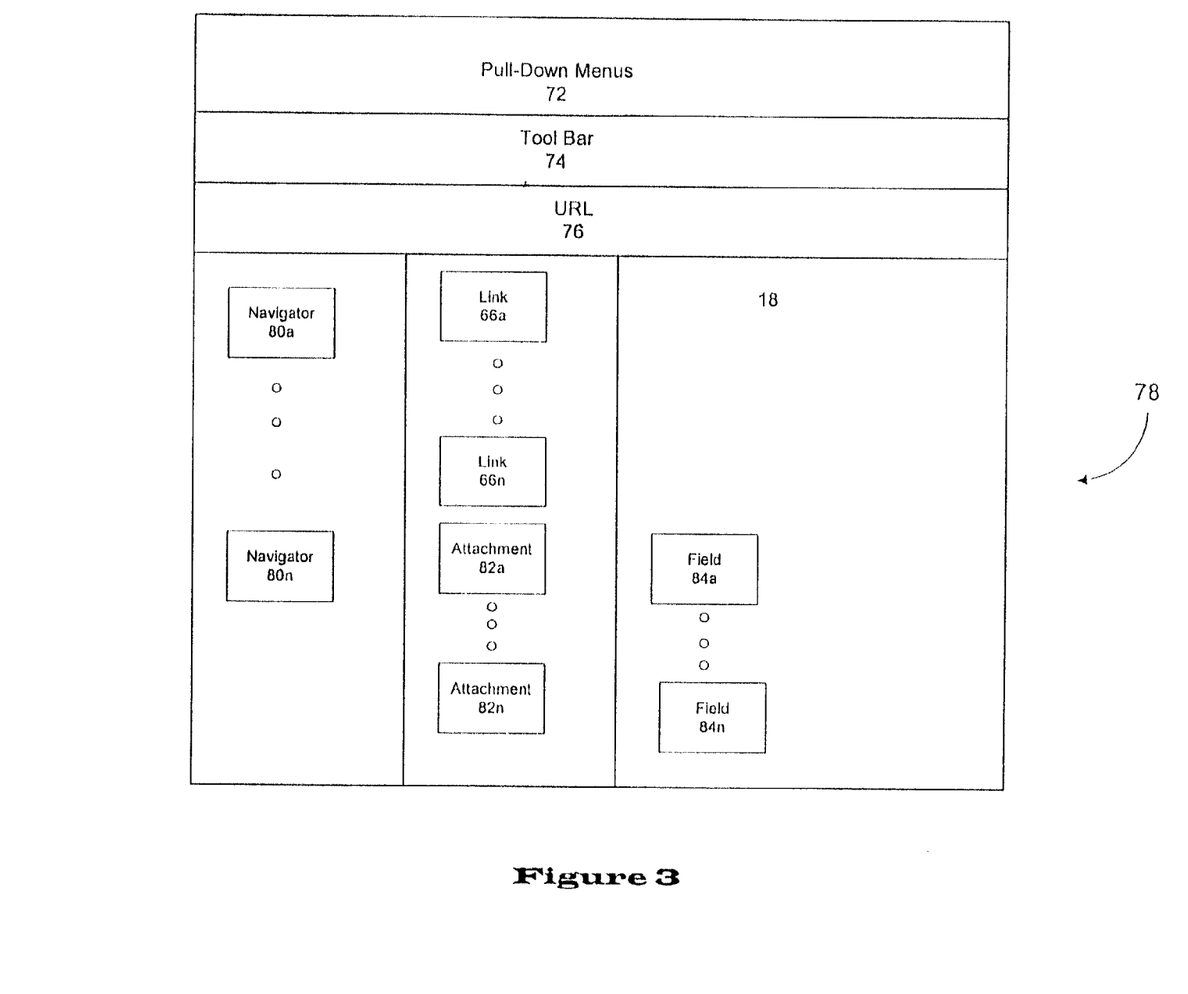
FIG. 3 is a view of a display in accordance with one embodiment of the invention.

FIG. 3 illustrates a HTML object 50a in accordance with one embodiment of the invention. System 10 permits a representation of non-HTML objects 18a–18n to be embedded within HTML objects 50a–50n. For example, a system user may retrieve HTML object 50a. The system user may request non-HTML object 18a to be displayed within HTML object 50a. System 10 retrieves non-HTML object 18a. Non-HTML object 18a is translated to a HTML representation 50n of non-HTML object 18a. System 10 uses HTML representation 50n to embed HTML representation 50n in HTML object 50a. FIG. 3 shows HTML object 50a with non-HTML objects (and other objects) embedded therein (e.g., pull-down menus 72, a tool bar 74, a URL identifier 76, a form 78, navigators 80, links 66, attachments 82 and fields 62). After non-HTML object 18a is embedded within HTML object 50*a*. HTML object 50*a* may be saved as another object which includes embedded non-HTML object 18*a*.

Preferably, HTML representation 50*n* comprises a table tag and HTML formatting tags. HTML tags are codes used in a HTML object that determine the layout of a HTML object. Views may comprise links to other views. For example, an object may contain a graphical representation of a view. The representation provides a link to the view which is retrieved when a user "clicks" on the representation. When a system user "clicks" on the representation, a URL request for that view is transmitted to HTTP server module 30. HTTP server module communicates the request to URL interface 46 of interface module 32. URL interface 46 converts the request into a format supported by non-HTML server module 24. Non-HTML server module 24 locates and retrieves the view requested and transmits the view to interface module 32. HTML translator 4 translates the view into HTML and passes the translated view to HTTP server module 30. HTTP server module 30 communicates the view requested to browser 28 for presenting to the system user. This process may be repeated for each additional view requested by the system user.

Navigators may also be embedded within HTML objects 50*a*–50*n*. Navigators assist system users in moving through documents. Navigators may be graphical representations or text that identify other portions of a document, other documents, etc. For example, a non-HTML object is requested by a system user. The non-HTML document may comprise a navigator. Module 30 translates the non-HTML object and navigator into HTML object 50*a*.

HTML fields 52*a*–52*n* may be expandable and collapsible. For example, HTML object 50*a* may comprise HTML field 52*a*. HTML field 52*a* may comprise a textual or graphical representation (e.g., a right arrowhead) indicating additional HTML fields 52*b*–52*n* are available. If a system user "clicks" on HTML field 52*a* using a conventional computer mouse, HTML field 52*a* expands displaying HTML fields 52*b*–52*n*. After "clicking" on HTML field 52*a*, the textual or graphical representation may change (e.g., to a down arrowhead) displaying additional HTML fields 52*b*–52*n*. If a user again "clicks" on HTML field 52*a*, the representation of HTML field 52*a* returns to the original representation (e.g., a right arrowhead) and "collapsing" HTML field 52*a*. This function previously applied only to non-HTML clients. The invention exposes this and other functions provided by non-HTML server modules 24 to browsers 28.

System 10 may also comprise a command cache 42. Command cache 42 maintains a record of a predetermined number of commands input by a system user. Commands may be stored based on system users. For example, a system user inputs a command, system 10 stores the command in command cache 42. Once a command is stored, system 10 checks whether subsequent commands input by the system user are stored in command cache 42. If system 10 locates the command in command cache 42, the stored command is used to process the command. This reduces the time necessary to process requests because system 10 does not have to repeat commands already executed. For example, a system user inputs a command "Retrieve Work File." The retrieve work file command may require system 10 to determine the object store storing the file, locate the position within the object store, retrieve the file and transmit the file to the system user. Subsequently (e.g., the following day), the system user inputs the same command. Before processing the command, system 10 determines whether the command "Retrieve Work File" is stored in command cache 42. If system 10 locates the command, the stored command is used to execute the command because the command has already been processed. In this manner, system 10 does not repeat commands previously executed and thus reduces processing time.

Unlike basic Web-based customer service applications, the invention workflow goes beyond the publishing of customer information to allow true customer-to-business interaction in which a specific business process is supported. For example, the advanced customer support system may be used to: initiate an inquiry, process the inquiry, assign the inquiry, notify the appropriate customer representative, and monitor the status of the inquiry.

Benefits of the invention range from minimizing the time and cost required to develop and deploy interactive Web applications, to actually achieving company goals that were once virtually impossible without the widespread use of the Internet.

There are several requirements of companies both large and small, regarding Web applications:

Interactivity. Much more than static HTML document delivery is required to enable interactive applications, especially in a supply chain management setting. The present invention provides the template forms and development tools to rapidly develop interactive applications.

Inter-enterprise connectivity. The most effective Web applications extend throughout a company's supply chain, from suppliers and business partners all the way to customers. The present invention lets users extend applications across their entire supply chain through the use of replication and workflow.

Multiple layers of security. Many of the Web applications that companies want to develop require multiple layers of security, from basic server access to customized/personalized pages, to page and field-level read/write authority. The present invention's access control security satisfies this requirement and enables companies to establish roles-based access to content.

Cost and development resources are a factor. Whereas initial Web site costs for publishing are typically small regardless of the product used, cost has become an important consideration when developing actual Web applications. The present invention helps minimize cost.

An example will be used for convenient reference.

Company A (a bank) desires to streamline customer service and improve existing business processes with their major commercial customers. They partnered with Company B (a consulting firm) to create an advanced customer support ("ACS") system to address those requirements. The system allows customers to have access to issue submission and tracking information, check imaging applications, customer-support knowledge bases, and other application functionality through a Web client. The system includes built-in workflow capabilities that manage the assignment and notification of key personnel of company A, and automate messaging, faxing, and paging. Customer issue status and service level reporting information is accessed via the Internet.

Other embodiments and uses of the invention will be apparent to those skilled in the art from consideration of the specification and practice of the invention disclosed herein. For example, the invention may apply to other client side applications which are based on URLs (e.g., news readers). The invention may also translate documents to formats other than HTML. The specification and examples should be considered exemplary only. The scope of the invention is only limited by the claims appended hereto.

What is claimed is:

1. A server system providing integrated scheduling and calendaring capability comprising:
   a server;
   at least one database associated with the server, the at least one database including a plurality of non-markup language objects, wherein at least one of the non-markup language objects comprises scheduling and calendaring information for at least one user; and
   a user interface that displays a plurality of object representations that correspond to the plurality of non-markup language objects,
   wherein the server enables selection of one or more of the plurality of object representations, and translates one or more non-markup language objects that correspond to the selected one or more object representations, the one or more non-markup language objects being translated to at least one markup language object.

2. The system of claim 1, wherein the at least one markup language object is displayed using a browser.

3. The system of claim 1, wherein the server comprises:
   a server module;
   an interface module comprising a markup language to non-markup language translator; and
   a non-markup language database server module.

4. The system of claim 3, wherein the server module comprises an HTTP server.

5. The system of claim 1, wherein the server is operable to:
   i) receive a URL-based selection from a browser for the one or more non-markup language objects that correspond to the selected one or more object representations; and
   ii) determine a location of the one or more non-markup language objects.

6. The system of claim 1, further comprising a passing module that passes the at least one markup language object to a browser.

7. A server system providing integrated scheduling and calendaring capability comprising:
   storing means for storing a plurality of non-markup language objects, wherein at least one of the plurality of non-markup language objects comprises scheduling and calendaring information for at least one user;
   displaying means for displaying a plurality of object representations that correspond to the plurality of non-markup language objects;
   selection enabling means, in communication with the storing means, for enabling the user to select one or more of the plurality of object representations; and
   translating means for translating one or more non-markup language objects that correspond to the selected one or more object representations, the one or more non-markup language objects being translated to at least one markup language object.

8. The system of claim 7, wherein the at least one markup language object is displayed by a presenting means for presenting the at least one markup language object.

9. The system of claim 7, further comprising retrieving means for retrieving the selected non-markup language object that comprises:
   markup language object receiving means for receiving markup language objects;
   markup language translating means for translating markup language objects to non-markup language objects and non-markup language objects to markup language objects; and
   non-markup language object receiving means for receiving non-markup language objects.

10. The system of claim 9, wherein the markup language object receiving means comprises an HTTP server.

11. The system of claim 7, wherein the selection enabling means is operable to:
   i) receive from a presenting means a URL-based selection of the one or more non-markup language objects that correspond to the selected one or more object representations; and
   ii) determine a location of the one or more non-markup language objects.

12. The system of claim 7, further comprising a passing means for passing the at least one markup language object to a presenting means for presenting the at least one markup language object.

13. A method for providing a server with integrated scheduling and calendaring capability comprising the steps of:
   storing a plurality of non-markup language objects in at least one object store, wherein at least one of the non-markup language objects comprise scheduling and calendaring information for at least one user;
   displaying a plurality of object representations that correspond to the plurality of non-markup language objects;
   enabling selection of one or more of the object representations from the plurality of object representations; and
   based on the selection, translating one or more non-markup language objects that correspond to the selected one or more object representations, the one or more non-markup language objects being translated to at least one markup language object.

14. The method of claim 13, further comprising the step of displaying the at least one markup language object.

15. The method of claim 13, further comprising:
   receiving at least one markup language object;
   translating the at least one markup language object to at least one non-markup language object; and
   receiving the at least one non-markup language object.

16. The method of claim 15, wherein receiving at least one markup object comprises receiving at least one markup object with an HTTP server.

17. The method of claim 13, wherein the step of enabling comprises the steps of:
   i) receiving a URL-based selection of the one or more non-markup language objects that correspond to the selected one or more object representations; and
   ii) determining a location of the one or more non-markup language objects.

18. The method of claim 13, further comprising presenting the at least one markup language object.

19. A processor readable medium having processor readable code embodied therein for providing a server with integrated scheduling and calendaring capability, the medium comprising:
   processor readable code for causing a processor to store a plurality of non-markup language objects in at least one database, at least one non-markup language object of the plurality of non-markup language objects comprising scheduling and calendaring information for at least one user;
   processor readable code for causing a processor to display a plurality of object representations that correspond to the plurality of non-markup language objects;

processor readable code for causing a processor to enable selection of one or more of the plurality of object representations; and processor readable code for causing a processor, based on the selection, to translate one or more non-markup language objects that correspond to the selected one or more object representations to at least one markup language object.

20. The medium of claim 19, further comprising processor readable code for causing a processor to open only a browser application for displaying the at least one markup language object.

* * * * *